United States Patent [19]

Omasa

[11] Patent Number: 5,730,856
[45] Date of Patent: Mar. 24, 1998

[54] METHOD FOR TREATING WASTE LIQUID WITH ELECTROLYTIC OXIDATION AND APPARATUS FOR CARRYING OUT THE SAME

[75] Inventor: Ryushin Omasa, Fujisawa, Japan

[73] Assignee: Nihon Techno Kabushiki Kaisha, Tokyo, Japan

[21] Appl. No.: 560,321

[22] Filed: Nov. 17, 1995

[30] Foreign Application Priority Data

Jul. 25, 1995 [JP] Japan .................. 7-209189

[51] Int. Cl.$^6$ ............................. C02F 1/461
[52] U.S. Cl. ............ 205/742; 205/771; 205/548; 204/222; 204/242; 204/273
[58] Field of Search ............ 205/742, 548, 205/771; 204/222, 242, 273

[56] References Cited

U.S. PATENT DOCUMENTS

| | | | |
|---|---|---|---|
| 4,443,304 | 4/1984 | Eidschun | 204/27 |
| 5,173,157 | 12/1992 | Nevels | 205/742 |
| 5,464,506 | 11/1995 | Bernard et al. | 205/566 |

FOREIGN PATENT DOCUMENTS

| | | |
|---|---|---|
| 275130 | 12/1991 | Japan . |
| 06287799 A | 10/1994 | Japan . |
| 06304461 A | 11/1994 | Japan . |

*Primary Examiner*—Arun S. Phasge
*Attorney, Agent, or Firm*—Kane,Dalsimer,Sullivan,Kurucz,Levy,Eisele and Richard, LLP

[57] ABSTRACT

An electroless nickel plating waste liquid (4) accommodated in an electrolytic oxidation tank (2) is treated by electrolytic oxidation with vibrating and fluidizing the waste liquid by means of an oscillating stirrer (10) to recover nickel by the electrolytic oxidation as well as recover the waste liquid in which an active component for fertilizer including phosphorus remains as a fertilizer solution. When the waste liquid is neutralized by a neutralizer including an active component for fertilizer such as potassium, nitrogen, etc., the fertilizer solution having higher content of the active component is obtained. The oscillating stirrer comprises an oscillation generator including a 25 to 500 Hz oscillating motor (18), an oscillating rod (22) connected to the oscillation generator, and multistage oscillating vanes (38) attached to the oscillating rod, and the oscillating vane is such that a tip end portion of the vane is fluttered when an oscillation is transmitted from the oscillating rod to the vane.

18 Claims, 12 Drawing Sheets

METHOD FOR TREATING WASTE LIQUID WITH ELECTROLYTIC OXIDATION AND APPARATUS FOR CARRYING OUT THE SAME

FIELD OF THE INVENTION

The present invention relates to method and apparatus for treating waste liquid, and in particular, to method and apparatus for treating waste liquid containing metal ions such as electroless nickel plating waste liquid to recover metal to lower the degree of pollution of the waste liquid. The present invention also relates to a method of utilizing the waste liquid treated thus treated as a fertilizer solution.

BACKGROUND OF THE INVENTION

An electroless nickel plating bath contains not only nickel salt to be plated, but also reductant, pH conditioner, buffer, etc. with a predetermined proportion. The balance among these components varies in accordance with the progress of the plating, and thus the bath is so deteriorated that the efficient plating becomes difficult. The plating bath deteriorated is discharged as the waste liquid. Since this waste liquid contains nickel ions, it cannot be sufficiently treated with microbial treatment. Therefore, conventionally, the waste liquid is discharged into the ocean because there is no effective treatment for the waste liquid. However, in recent years, it becomes prohibited to discharge the waste liquid into the ocean on a viewpoint of preventing environmental pollution.

As a method for removing metal ions from the waste liquid, there is an electrolytic oxidation method. However, this method requires a long period of time and, therefore it has been desired to shorten a process time of the electrolytic oxidation method. In order to realize short period of the process time therefor, it would be considered to conduct the process with stirring. However, it was found that a conventional screw propeller type stirrer is insufficient for improving the efficiency of treatment.

In general, the electroless nickel plating waste liquid also contains salts of phosphorus such as sodium hypophosphite, and it is extremely difficult to remove such salts because phosphoric ions usually form extremely stable complex salt, resulting in difficulty in treating the waste liquid.

There are similar problems to the above in treating waste liquids of electroless plating of copper, cobalt, tin, silver, gold and alloys thereof.

SUMMARY OF THE INVENTION

The present invention was made in view of the foregoing circumstances. An object of the present invention is to recover the metal at a superior efficiency from the waste liquid containing metal ions such as electroless nickel plating waste liquid to lower the degree of pollution of the liquid.

The other object is to recover the metal at a superior efficiency from the waste liquid containing metal ions and to allow active components for fertilizer to remain in the waste liquid so that the waste liquid treated is utilized as a fertilizer solution.

Further object is to lower COD and/or BOD in the waste liquid to the extent enough to discharge it.

According to the present invention, the waste liquid is vibrated and fluidized by means of an ocsillating stirrer which oscillates at a low frequency, so that the electrolytic oxidation is expedited as well as the waste liquid is well contacted with active gasses generated through the electrolytic oxidation to lower COD and/or BOD to the extent sufficient to discharge it into the ocean or river.

In order to achieve the foregoing objects, according to the present invention, there is provided a method for treating a waste liquid containing metal ions, the waste liquid being accommodated in an electrolytic oxidation tank, wherein the waste liquid is treated by electrolytic oxidation with vibrating and fluidizing the waste liquid by means of an oscillating stirrer, the oscillating stirrer comprising an oscillation generator, an oscillation transmitter connected to the oscillation generator, and one-stage or multistage oscillating vane attached to the oscillation transmitter, the oscillating vane being such that a tip end portion thereof is fluttered when an oscillation is transmitted from the oscillation transmitter to the vane.

A frequency of the oscillation generator is preferably within a range of 25 to 500 Hz.

The waste liquid is for example an electroless nickel plating waste liquid.

Metals are recovered by the electrolytic oxidation, and the waste liquid in which an active component for fertilizer remains can be recovered as a fertilizer solution.

In one embodiment of the present invention, a first step is conducted to recover the metal in which first step the waste liquid is treated by the electrolytic oxidation with vibrating and fluidizing the waste liquid by means of an oscillating stirrer, and then a second step is conducted to recover as the fertilizer solution the waste liquid in which the active component for fertilizer remains in which second step a neutralizer is added to neutralize the waste liquid. The neutralizer may comprise at least one of KOH, $NH_3$ and $NH_4OH$.

In order to achieve the foregoing objects, according to the present invention, there is also provided an apparatus for treating a waste liquid containing metal ions, comprising:

an electrolytic oxidation tank provided with at least a pair of electrodes; and an oscillating stirrer for vibrating and fluidizing the waste liquid accommodated in the electrolytic oxidation tank.

Preferably, the oscillating stirrer comprises an oscillation generator, an oscillation transmitter connected to the oscillation generator, and one-stage or multistage oscillating vane attached to the oscillation transmitter, the oscillating vane being such that a tip end portion thereof is fluttered when an oscillation is transmitted from the oscillation transmitter to the vane.

The oscillation generator preferably has a means for varying a frequency of the oscillation.

Preferably, a first vibrational stress dispersing means is interposed between the oscillation generator and the oscillation transmitter.

Preferably, the oscillating vane comprises a vane plate, a fixing member for the vane plate and a second vibrational stress dispersing means interposed between the vane plate and the fixing member.

Preferably, the oscillating vane is attached to a vane attaching portion of the oscillation transmitter, the vane attaching portion extends in one direction and oscillates in the one direction, and the oscillating vane is inclined relative to a plane perpendicular to the one direction. The one direction may be a vertical direction and the oscillation vane is inclined so as to gradually lower as advancing from a portion attached to the vane attaching portion to a tip end portion.

In one embodiment of the present invention, the apparatus further comprises a neutralizing tank in which the waste liquid discharged from the electrolytic oxidation tank is neutralized.

According to the present invention, the metal can be recovered at a superior efficiency from the waste liquid containing metal ions to lower the degree of pollution of the liquid.

Furthermore, according to the present invention, the waste liquid can be utilized as a fertilizer solution in inductrial scale on the basis of superior efficiency of treating the waste liquid.

Furthermore, according to the present invention, the content of metal ions, COD and/or BOD of the waste liquid can be lowered to the extent enough to discharge it into the ocean, river or the like.

According to the present invention, if the electroless nickel plating waste liquid is treated, a large amount of phosphorus component contained in the waste liquid can be effectively used as an active component of the fertilizer solution without being diluted and thus the electroless nickel plating waste liquid can be recycled. When the neutralizer containing the active component for the fertilizer such as KOH, $NH_3$ and $NH_4OH$ is used, the fertilizing effect can be further enhanced. The fertilizer solution obtained in this invention is directly applicable to plants. Since no aeration is required in the electrolytic oxidation process, occurrence of intensely offensive smell due to aeration can be suppressed. Occurrence of mist is more suppressed as compared with a conventional electrolytic oxidation treatment. Nickel can be withdrawn with high yield.

DESCRIPTION OF THE PREFERRED EMBODIMEMTS

Figure 1:
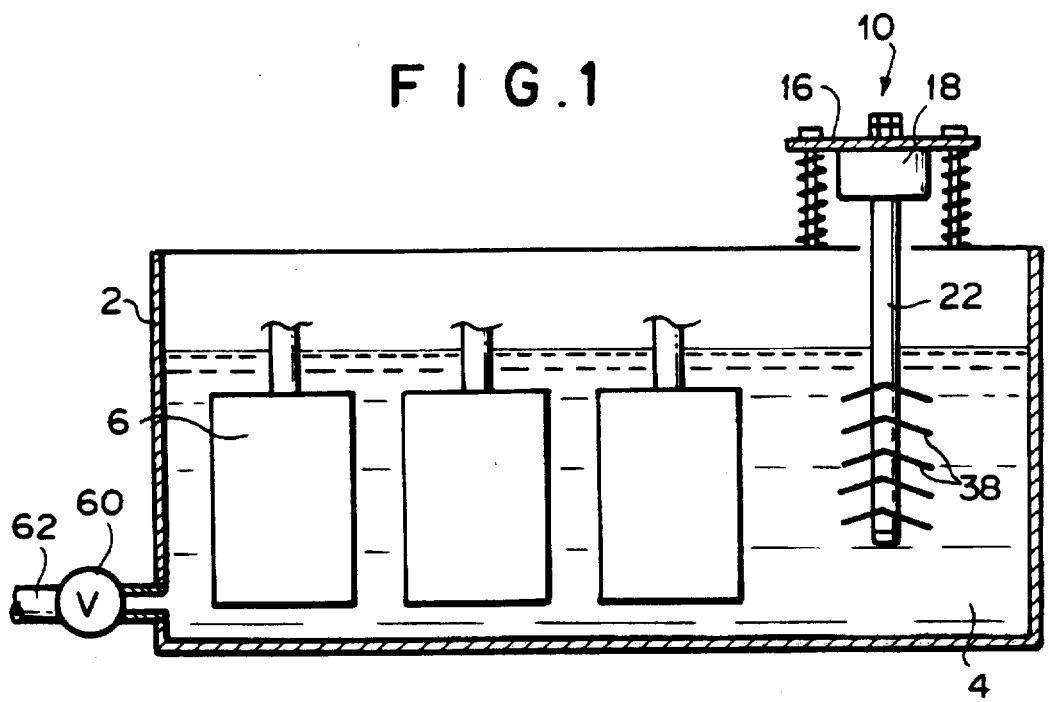
FIG. 1 is a schematic cross-sectional view showing an embodiment of a waste liquid treating apparatus according to the present invention.

Next, some specific embodiments of the present invention are described with reference to the accompanying drawings.

A preferable condition of the electrolytic oxidation according to the present invention is as follows:

Quantity of Electricity (*); 1 to 30 A/liter

Current Density; 3 to 40 $A/dm^2$

Bath Temperature; 20° to 80° C.

Distance between electrodes; 5 to 10 cm pH; 3.5 to 6.0

(*: current to be supplied per 1 liter of waste liquid)

The electroless nickel plating solution contains the following components, and the balance among these components is varied in accordance with the progress of plating and, thus the plating solution is deteriorated to become waste liquid:

(A) Main Components
  1. nickel salt
  2. reductant: sodium hypophosphite, sodium borohydride, hydrazine or the like (B) Auxiliary Components
  1. pH conditioner: basic compound such as sodium hydroxide and ammonium hydroxide, inorganic acid, organic acid or the like
  2. buffer: hydroxy carboxylic acid group such as sodium citrate and sodium acetate, inorganic acid having low dissociation constant such as boric acid, alkali salt of organic or inorganic acid
  3. complexing agent: alkali salt of organic acid, triethanol-amine, ethylenediamine, glycine or the like
  4. accelerator: ammonium sulfide, reductive fluoride or the like
  5. stabilizer: lead chloride, lead sulfide, lead nitrate
  6. improver: surfactant or the like If such electroless nickel plating waste liquid is treated under the condition of the electrolytic oxidation treatment of the present invention, the nickel content of about 4000 to 6000 ppm in the waste liquid is reduced to about 0 to 30 ppm, and the COD of about 10000 to 40000 ppm is reduced to about 30 to 500 ppm.

The pH of the treated liquid obtained by electrolytically oxidizing the electroless nickel plating waste liquid is distributed in a range from acid to neutrality in accordance with the kind of buffer contained in the electroless nickel plating solution, the electrolytic oxidation condition or the like. When the pH of the treated liquid is acidic, the treated liquid can be neutralized with alkali. If the alkali containing an element having fertilizing effect is used in the neutralization process, the quality of treated liquid when used as a fertilizer can be raised.

As the oscillating stirrer may be used any one of stirrers as disclosed in Japanese Patent Publicaton No. 6-71544, Japanese Patent Laid-Open Publication Nos. 6-287799 and 6-304461. These stirrers were invented by the inventor of this application. The oscillating stirrer of this invention basically comprises an oscillation generator having an oscillating motor, an oscillating rod (oscillation transmitter) connected to the oscillation generator, and a one-stage or multistage oscillating vanes which are fixed to the oscillating rod so as not to be rotatable. The oscillating vanes are flexibly bent at the tip portions thereof by oscillation to induce vibration and fluidization in the liquid or system to cause a vigorous turbulent flow, whereby the system is stirred.

Figure 2:
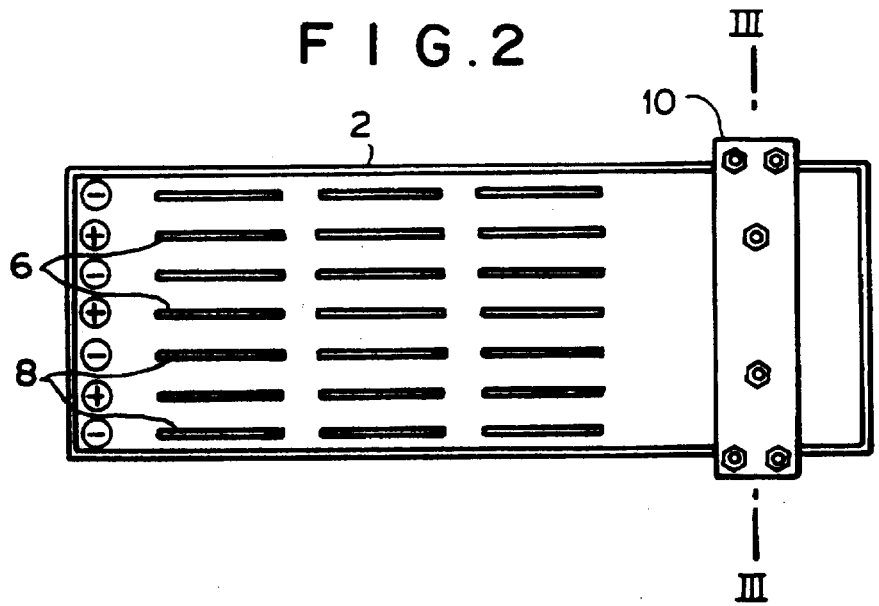
FIG. 2 is a schematic plan view of the apparatus of FIG. 1.
Figure 3:
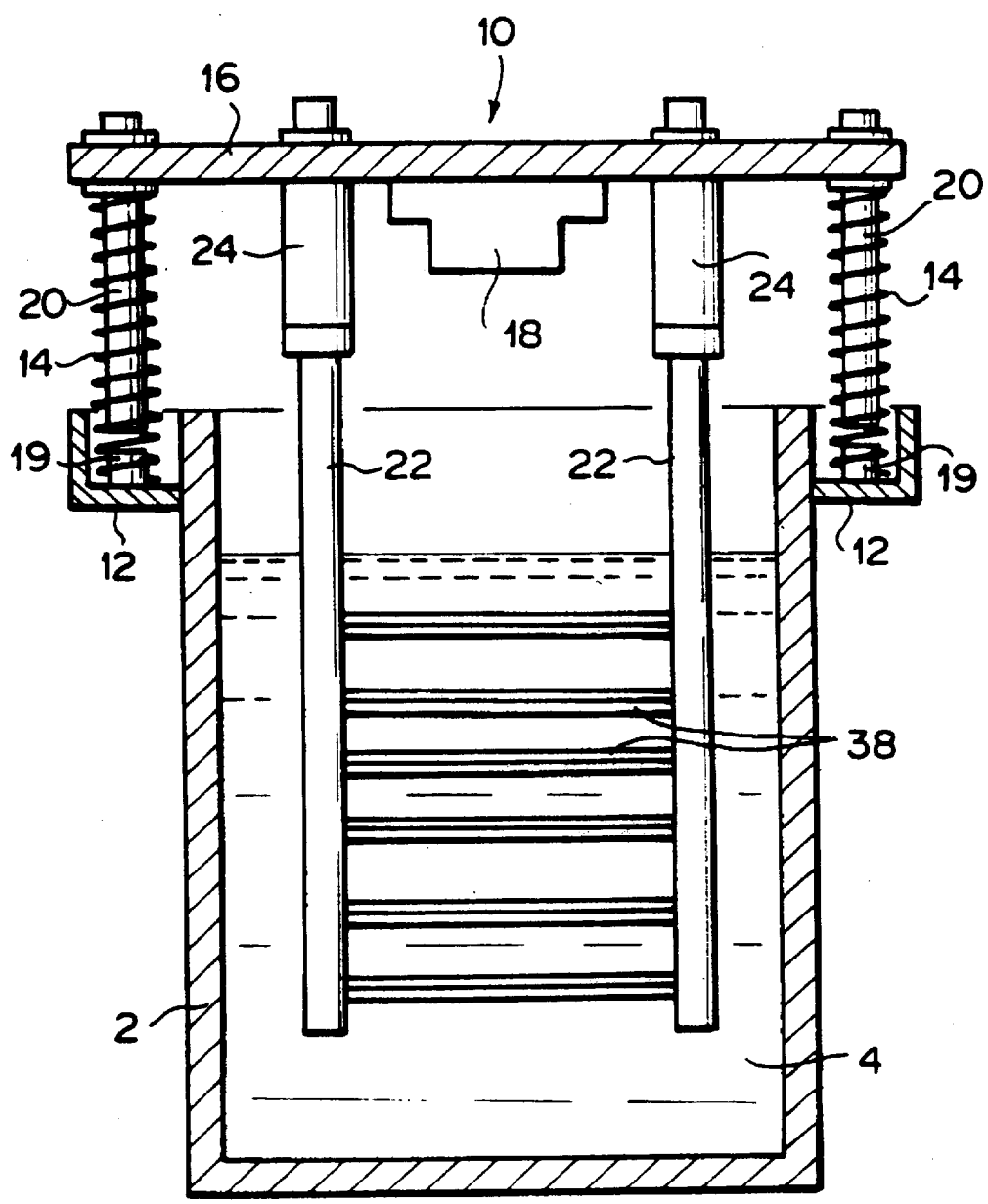
FIG. 3 is a cross-sectional view taken along line III—III of FIG. 2.

FIG. 1 is a schematic cross-sectional view showing an embodiment of a waste liquid treating apparatus according to the present invention. FIG. 2 is a schematic plan view of the apparatus of FIG. 1, and FIG. 3 is a cross-sectional view taken along line III—III of FIG. 2.

In these Figures, reference numeral 2 denotes an electrolytic oxidation tank or cell, 4 an electroless nickel plating waste liquid charged in the tank, 6 and 8 an annode and cathode for electrolysis respectively, and 10 an oscillating stirrer.

The cathode 8 is preferably formed of a material on which recovered metal is liable to be electrodeposited, and from which the electrodeposited metal is easily exfoliated. An example of the preferable material for the cathode is stainless steel. The anode 6 is preferably formed of a material through which current is liable to flow and which is substantially insoluble and inconsumable. An example of the preferable anode is an electrode coated with lead oxide.

The oscillation generator 10 has the following constitution. A supporting member 12 is secured to the tank 2. On the supporting member 2, a basic oscillation member 16 is loaded via a plurality of coiled springs 14. Inside of each spring 14, there is positioned a lower supporting rod 19 secured to the supporting member 12 vertically and an upper supporting rod 20 secured to the basic oscillation member 16 vertically in alignment with the lower supporting rod 19. The upper end surface of the lower supporting rod 19 is separated at a certain distance from the lower end surface of the upper supporting rod 20. An oscillating motor 18 is mounted on the lower surface of the basic oscillation member 16. The oscillation generator comprises the oscillating motor 18 and the basic oscillation member 16.

As mentioned in the above, the oscillation generator and the electrolytic oxidation tank 2 are linked to each other by four upper supporting rods 20 which extend from the oscillation generator downwardly in a vertical direction, four lower supporting rods 19 which extend from the electrolytic oxidation tank side upwardly in the vertical direction so as to correspond to the upper supporting rods 20, and springs 14 which are wound around the upper and lower supporting rods. Particularly, since the upper and lower supporting rods 20, 19 are supported by the springs 14 in noncontact with each other, even when lateral oscillation or vibration occurs in the oscillation generator, it is absorbed by the link portion of the upper and lower supporting rods, and therefore occurrence of undesirable lateral oscillation or vibration and the accompanying noises on the apparatus as a whole can be prevented. Furthermore, since the oscillating motor 18 is secured to the lower surface of the basic oscillation member 16, the center of gravity of the oscillation generator is lowered and thus undesirable lateral oscillation can be also prevented.

Figure 4:
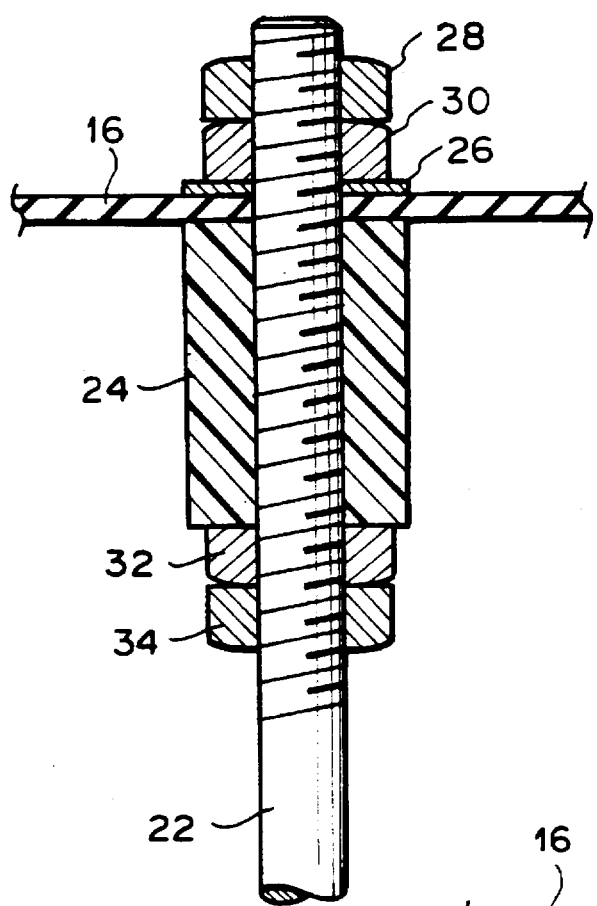
FIGS. 4 and 5 are each an enlarged cross-sectional view showing a portion of an oscillating rod attached to a basic oscillation member.

The upper portion of the oscillation rod 22 which acts as the oscillation transmitter is attached to the basic oscillation member 16. FIG. 4 shows an enlarged cross-section of the portion of the oscillating rod 22 attached to the basic oscillation member 16.

When attaching the oscillating rod 22 to the basic oscillation member 16, in order to avoid such troubles that a contact portion of the oscillation generator and the oscillating rod 22 is cracked or broken out due to concentration of vibrational stress at a rather high oscillation frequency, a vibrational stress dispersing means is preferably provided thereon. In this embodiment, as the vibrational stress dispersing means is used an elastic ring 24 which is provided at the lower side of the basic oscillation member 16 and around the oscillating rod 22. The elastic ring 24 may be formed of a hard elastic member having Shore A hardness of 80 to 120, preferably 90 to 100, such as hard natural rubber, hard synthetic rubber, synthetic resin or the like. Particularly, hard urethane rubber having Shore A hardness of 90 to 100 is preferable in durability and chemical resistance. The length of the elastic ring 24 is set to be greater than the diameter of the oscillating rod 22, and it is usually set to three to eight times as long as the diameter of the oscillating rod 22. In addition, the diameter of the elastic ring 24 is set to 1.3 to 3.0 times, preferably about 1.5 to 2.5 times as large as the diameter of the oscillating rod 22. From another view point, when the oscillating rod 22 is a cylindrical rod having a diameter of 10 to 16 mm, the thickness thereof is preferably set to 10 to 15 mm. When the cylindrical oscillating rod has a diameter of 20 to 35 mm, the thickness thereof is preferably set to 20 to 30 mm.

Reference numeral 26 denotes a washer, 28, 30, 32 and 34 each a nut. When connecting the rod 22 to the basic oscillation member 16, the nuts 34 and 32 and the elastic ring 24 are engaged with the upper threaded portion of the rod 22, then the upper threaded portion is passed through an opening of the basic oscillation member 16, and then the washer 26 and the nuts 30 and 28 are engaged with the upper threaded portion of the rod 22.

Figure 5:
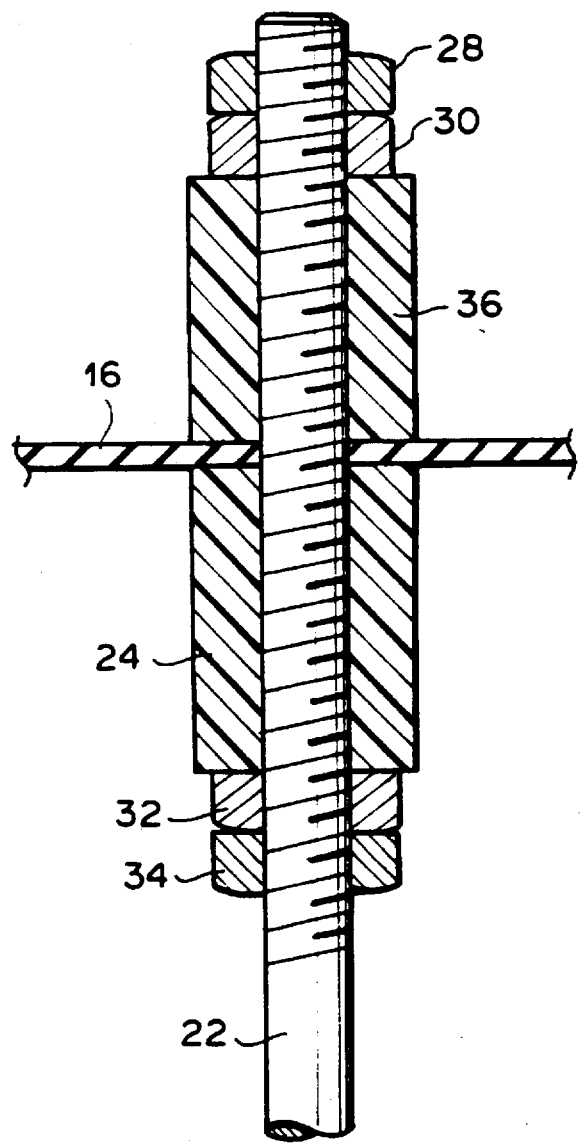

FIG. 5 shows an enlarged cross-section of an another embodiment of the upper portion of the oscillating rod 22 attached to the basic oscillation member 16. Herein, the ring 24 is positioned at the lower side of the basic oscillation member 16, and additionally, at the upper side of the basic oscillation member 16 is positioned an elastic ring 36 which is substantially the same as the ring 24. According to this embodiment, the vibrational stress dispersing effect is more improved. As the vibrational stress dispersing means, the elastic ring 36 is merely used without using the ring 24.

As shown in FIGS. 1 and 3, a plurality of oscillating vanes 38 extending horizontally are positioned in parallel to each other. Both ends of each vane 38 are attached to the corresponding oscillating rods 22.

The frequency of oscillating motor 18 is usually set to about 25 to 900 Hz, preferably to about 25 to 300 Hz, more preferably to about 25 to 60 Hz. If the frequency is lower than 25 Hz, it tends to become difficult to generate satisfactory vibration and fluidization in the liquid 4. If the frequency is higher than 500 Hz, very high driving force is often required in order to oscillate the vane 38 with enough amplitude, so that a greater vibrational stress is generated in the oscillating stirrer 10, especially in a connecting portion of the oscillation generator and the oscillation transmitter or in a connecting portion of the oscillation transmitter and the oscillating vane or the oscillating vane 38 itself, resulting in breakdown of the stirrer 10. Means for varying the frequency of the oscillation motor 18, e.g. an inverter, can be used. Oscillation generated at the motor 18 is transmitted via the basic oscillation member 16 and the oscillating rod 22 to the oscillating vane 38. The vane 38 oscillates in a substantially vertical direction, causing the vibration and fluidization in the waste liquid 4 so as to stir the waste liquid. The relationship between the output of oscillating motor 18 and the volume of liquid 4 to be stirred is usually as in the following Table 1:

TABLE 1

| Output of oscillating motor | Volume of liquid |
| --- | --- |
| 75W (200 V, 3 phase) | ~200 liters |
| 150W (200 V, 3 phase) | 200–350 liters |
| 250W (200 V, 3 phase) | 350–800 liters |
| 400W (200 V, 3 phase) | 800–1500 liters |
| 750W (200 V, 3 phase) | 1500–2500 liters |

If the output of the motor is set to 3 kW, liquid of 100 m$^3$ in volume can be sufficiently stirred.

Figure 6:
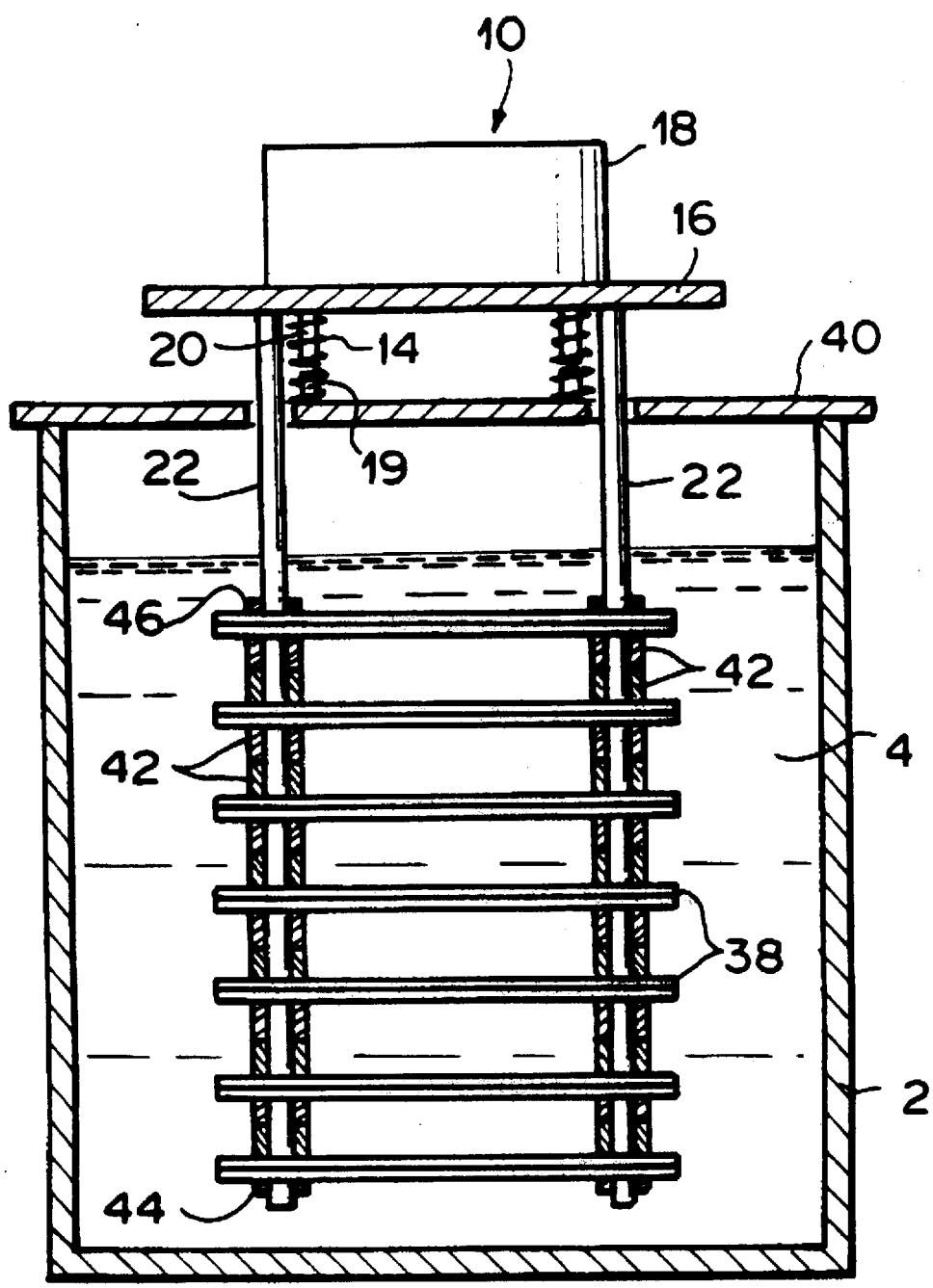
FIG. 6 is a schematic cross-sectional view showing an embodiment of a waste liquid treating apparatus according to the present invention.

FIG. 6 is a schematic cross-sectional view showing an embodiment of a waste liquid treating apparatus according to the present invention, especially showing the oscillating stirrer 10 and the neighborhood thereof.

As shown in FIG. 6, a stand 40 is mounted through an elastic member (not shown) on an electrolytic oxidation tank 2, a basic oscillation member 16 is provided on the stand 40 in the same manner as the embodiment of FIG. 3 via a coiled spring 14, a lower supporting member 19 and an upper supporting member 20. The oscillating motor 18 is secured on the upper surface of the basic oscillation member 16. Two oscillating rods 22 are each attached to the basic oscillation member 16 in the same manner as the embodiment of FIG. 3.

The oscillating rod 22 extends through the stand 40 in noncontact with it. On each oscillating rod 22, a spacer 42 is positioned between the neighboring oscillation vanes 38, and, the vanes 38 and the spacer 42 are fixed to the rod 22 by nuts 44 and 46 engaged to threaded portions of the rod 22 at the lower side of the lowermost vane and the upper side of the uppermost vane respectively. Such a manner of fixing the vanes makes it easy to exchange the vane and vary the number of vane used depending on the length of the spacer so that the optimum number of vane can be easily used for any viscosity of the waste liquid 4.

Figure 7:
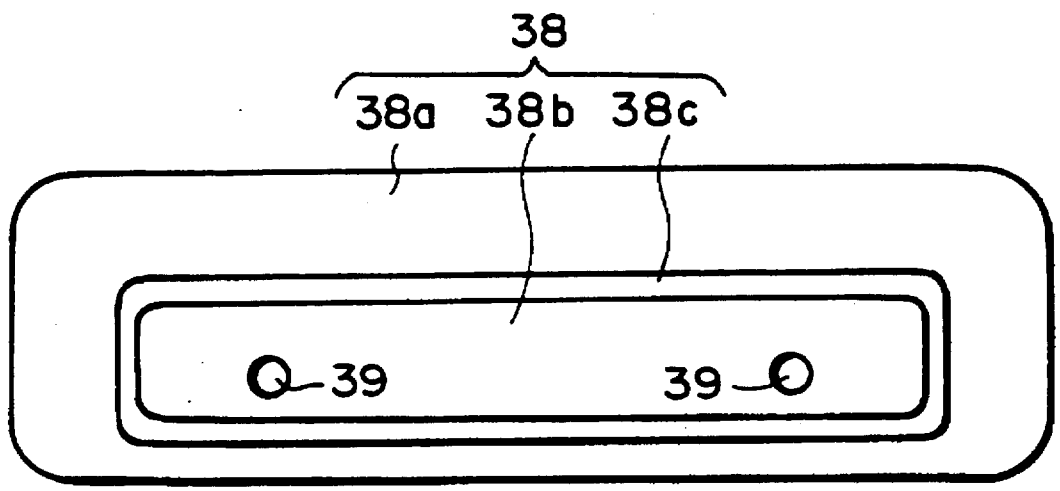
FIG. 7 is a plan view showing an oscillating vane.
Figure 8:
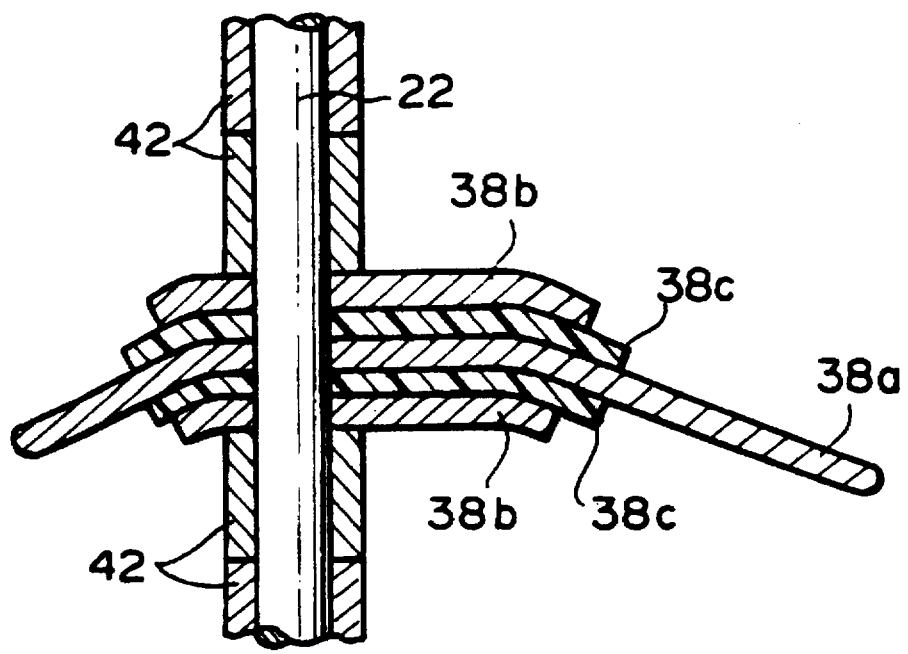
FIG. 8 is a cross-sectional view showing an oscillating vane.
Figure 9A:
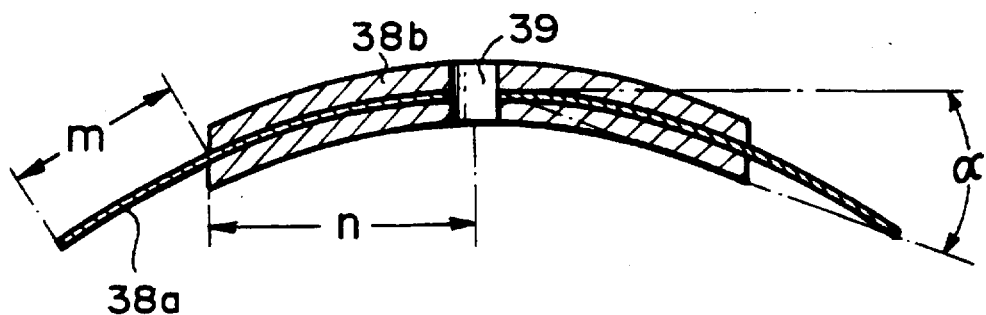
FIG. 9A is a cross-sectional view showing an oscillating vane.
Figure 9B:
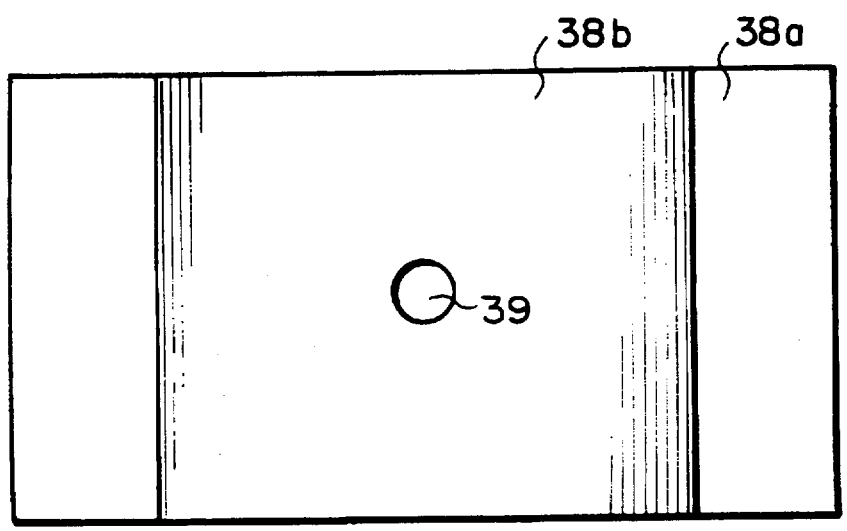
FIG. 9B is a plan view showing an oscillating vane.
Figure 10:
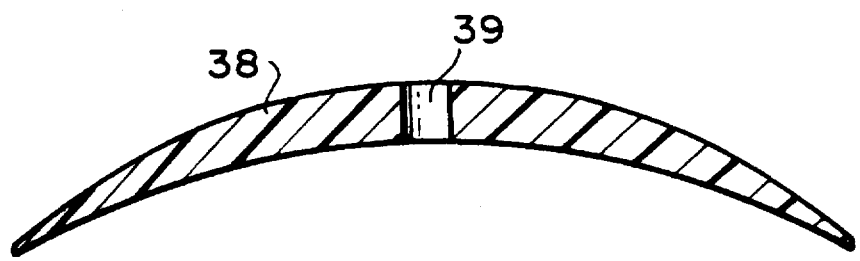
FIG. 10 is a cross-sectional view showing an oscillating vane.

FIG. 7 is a plan view of the vane 38 of FIG. 6, and FIG. 8 is a cross-sectional view thereof. Reference numeral 39 denotes an opening to be used for inserting the rod 22 when attaching thereto. The oscillating vane 38 which is not rotated comprises a vane plate 38a and a vane plate fixing member 38b as shown in FIGS. 9A, 9B, 11A and 11B. Alternatively, the oscillating vane 38 may comprise a plurality of vane plates which are laminated on each other, or a vane plate and a vane plate fixing member which are integrally formed with each other as shown in FIG. 10.

The vane plate may be formed of thin metal, elastic synthetic resin, rubber or the like, and it has such a thickness that at least tip portion of the vane plate shows a flutter phenomenon (a waving or pliant state) on the basis of the oscillation in the vertical direction generated at the oscillation motor and transmitted via the oscillation rod. With this construction, the system of the waste liquid is vibrated and fluidized. When the metal vane plate is used, it may be formed of titanium, aluminum, copper, iron, stainless steel or alloys thereof. When the synthetic resin is used, it may be formed of polycarbonate, thermostable vinyl chloride resin, polyamide resin, polypropylene or the like. No limitation is imposed on the thickness of the oscillating vane plate as long as it transmits oscillation energy to cause the effect of the oscillational stirring. However, in general, 0.2 to 2 mm is preferable for the metal vane plate, and 0.5 to 10 mm is preferable for the plastic vane plate. If the thickness is excessively large, the effect of the oscillational stirring is degraded.

One-stage or multistage of oscillating vane 38 may be secured to the oscillating rod 22. When the multistage of oscillating vane are secured, five to seven oscillating vanes are preferably used in accordance with the power of the oscillating motor 18. When the number of stages is increased, the oscillational amplitude is reduced as a load of the oscillating motor is increased, so that the oscillating motor may be heated.

The oscillating vane 38 may be disposed horizontally or perpendicularly to the oscillating rod, however, it can be disposed with an inclination angle α relative to the horizontal plane. The angle α is for example 5 to 30 degrees, preferably 10 to 20 degrees, thereby providing the oscillation with directionality. In this invention, the oscillating vane is preferably inclined downwardly, namely, gradually lower as advancing from a portion attached to the rod to the tip end portion, as shown in FIGS. 9A and 10. With this configuration, the reaction in the tank 2 can be expedited because active gasses generated in the waste liquid 4 by the electrolysis are held within the liquid relatively long period of time.

When the oscillating vane plate 38a is formed of metal such as stainless steel, a synthetic resin sheet 38c having chemical resistance, for example, a synthetic resin sheet which is represented by fluorine resin such as polytetrafluoroethylene, is preferably interposed between the vane plate 38a and the vane plate fixing member 38b (See FIGS. 7 and 8). With this construction, the lifetime of the vane plate 38a can be remarkably extended because of dispersion of the vibrational stress. No special limitation is imposed on the thickness of the synthetic resin, however, 1 to 3 mm is usually sufficient. When the synthetic resin sheet 38c having a size somewhat greater than that of the fixing member 38b, the lifetime of the vane plate can be more extended because the vibrational stress is well dispersed. The vane plate 38a and the fixing member 38b preferably have the equally inclined and/or bent surface as viewed from the side as shown in FIG. 9A and, in such a case, dispersion of the vibrational stress can be more effectively performed. Particularly when the oscillation frequency is high, the vane plate 38a can be avoided from being damaged with the above construction.

As shown in FIGS. 7 and 8, the oscillation vane 38 may be attached to the rod 22 with a positional deviation toward the anode and cathode. According to such a construction, the degree of the vibration and fluidization of the waste liquid 4 at areas where the electrolysis is effected can be made higher.

When the oscillation vane 38 is integrally formed of plastic material as shown in FIG. 10, unlike the case where the oscillation vane plate and the fixing member therefor are formed separately from each other, there can be avoided the following drawbacks: materials contained in the liquid intrudes into the joint portion thereof and becomes fixed thereto, and it takes a long time to clean these members. Furthermore, there occurs no step in thickness and the concentration of stress can be avoided, so that the oscillation vane can be avoided from being damaged.

Figure 11A:
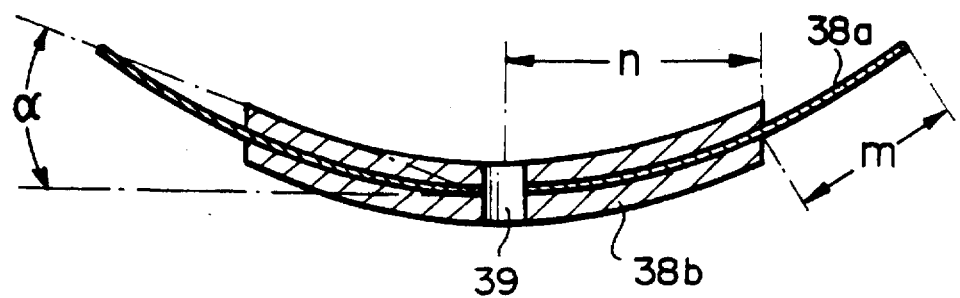
FIG. 11A is a cross-sectional view showing an oscillating vane.
Figure 11B:
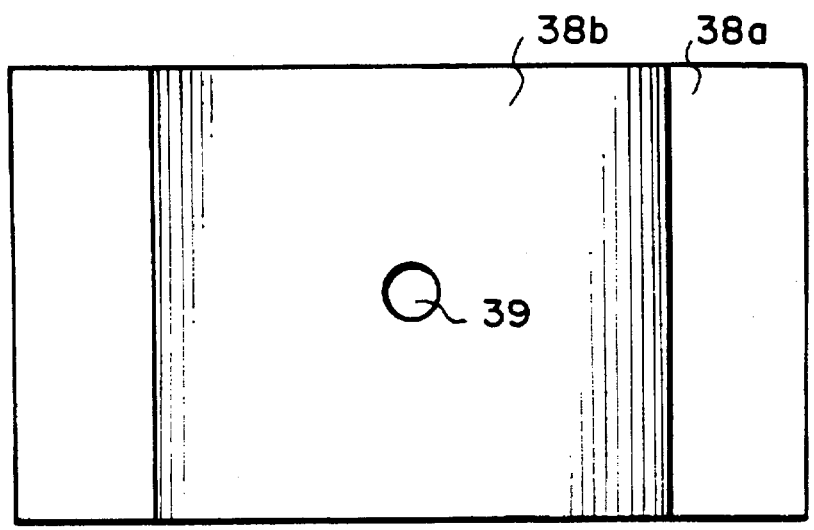
FIG. 11B is a plan view showing an oscillating vane.
Figure 12:
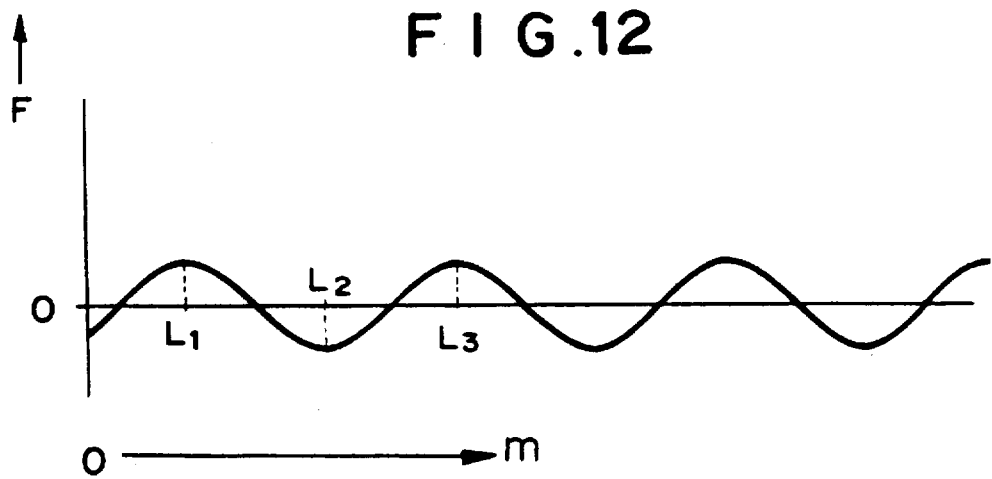
FIG. 12 is a schematic diagram for explaining a fluttering.

The magnitude of the "flutter phenomenon" of the tip end of the oscillation vane 38 which is induced by the oscillation of the oscillation vane is varied in accordance with the frequency of the oscillation, the length and thickness of the oscillation vane plate, the viscosity and specific gravity of the waste liquid to be treated, and thus it is preferable to select such length and thickness of the vane plate as provides most powerful "fluttering" at a given frequency. As the length (length of a portion extending from the fixing member to the tip) of the oscillation vane plate, i.e. "m" shown in FIGS. 9A and 11A, is varied while the frequency and the thickness of the vane plate are constant, the magnitude (F) of the "fluttering" of the vane plate varies substantially periodically as shown in FIG. 12. It is preferable to select the length $L_1$ providing a first peak or the length $L_2$ providing a second peak as the length m of the vane plate. One of the length corresponding to the first peak and the length corresponding to the second peak is suitably selected in accordance with the requirement that the vibration of the system should be magnified or the fluidization is intensified. When the length $L_3$ corresponding to the third peak is selected, the amplitude of the oscillation is reduced.

The following Table 2 shows an experimental result when the lengths $L_1$ and $L_2$ exhibiting the first and second peaks respectively are obtained at a frequency of 37 to 60 Hz and at 75 W for an oscillation vane plate made of stainless steel (SUS 304) as the thickness T thereof is varied.

TABLE 2

| T (mm) | $L_1$ (mm) | $L_2$ (mm) |
| --- | --- | --- |
| 0.10 | about 15 | |
| 0.20 | about 25 | about 70 |
| 0.30 | about 45 | 110–120 |
| 0.40 | about 50 | 140–150 |
| 0.50 | about 55 | |

In this experiment, the length from the center of the oscillating rod to the tip end portion of the fixing member, i.e. "n" shown in FIG. 11A, is set to 27 mm, and the inclination angle α is set to 15 degrees upwardly.

The oscillation amplitude of the tip end of the oscillation vane 38 is for example 2 to 30 mm, preferably 5 to 10 mm, and the frequency of the oscillation vane 38 is for example 3 to 50 Hz, preferably 6 to 13 Hz.

Figure 13:
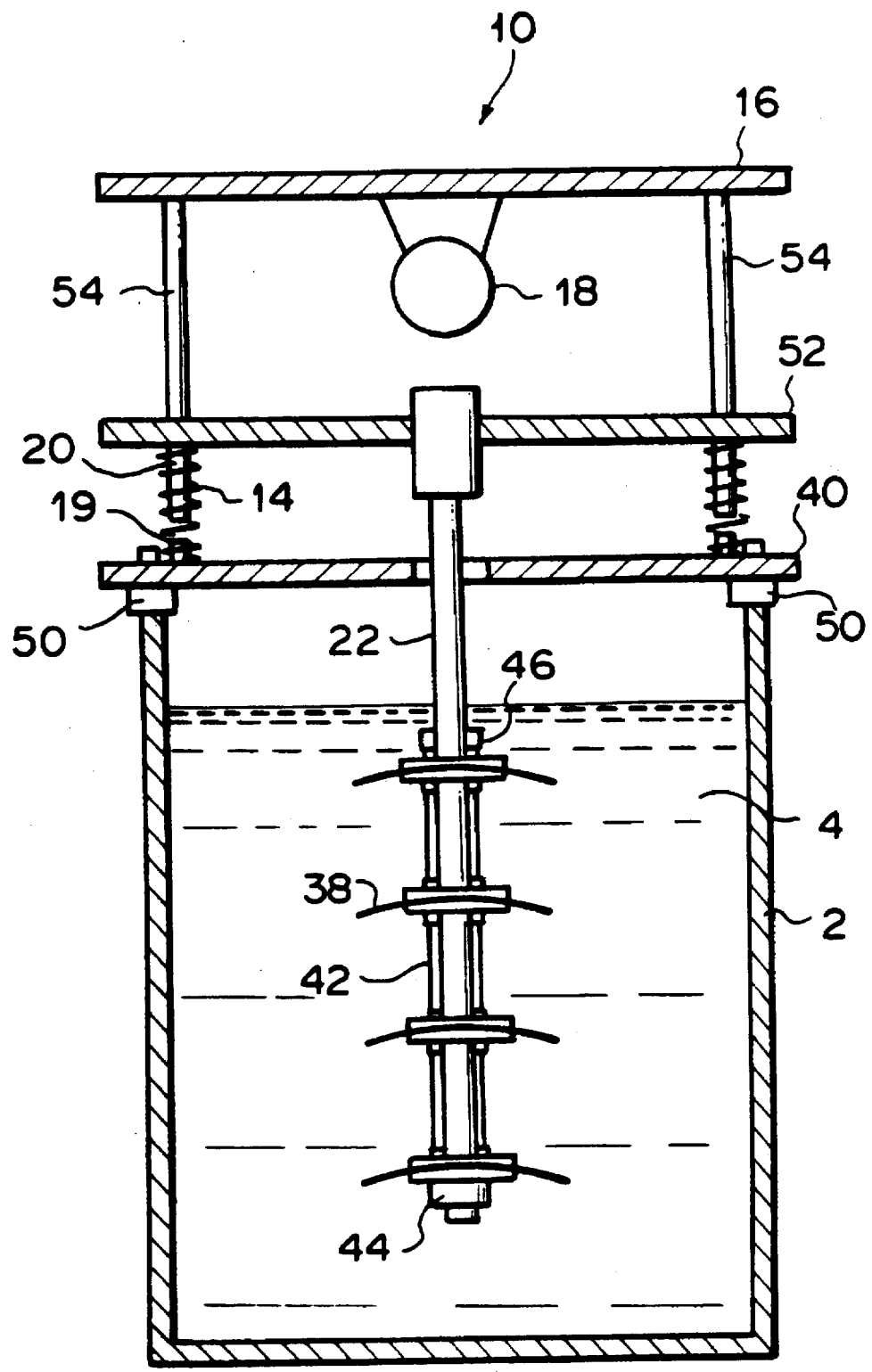
FIGS. 13, 14 and 15 are each a schematic cross-sectional view showing an embodiment of a waste liquid treating apparatus according to the present invention.
Figure 14:
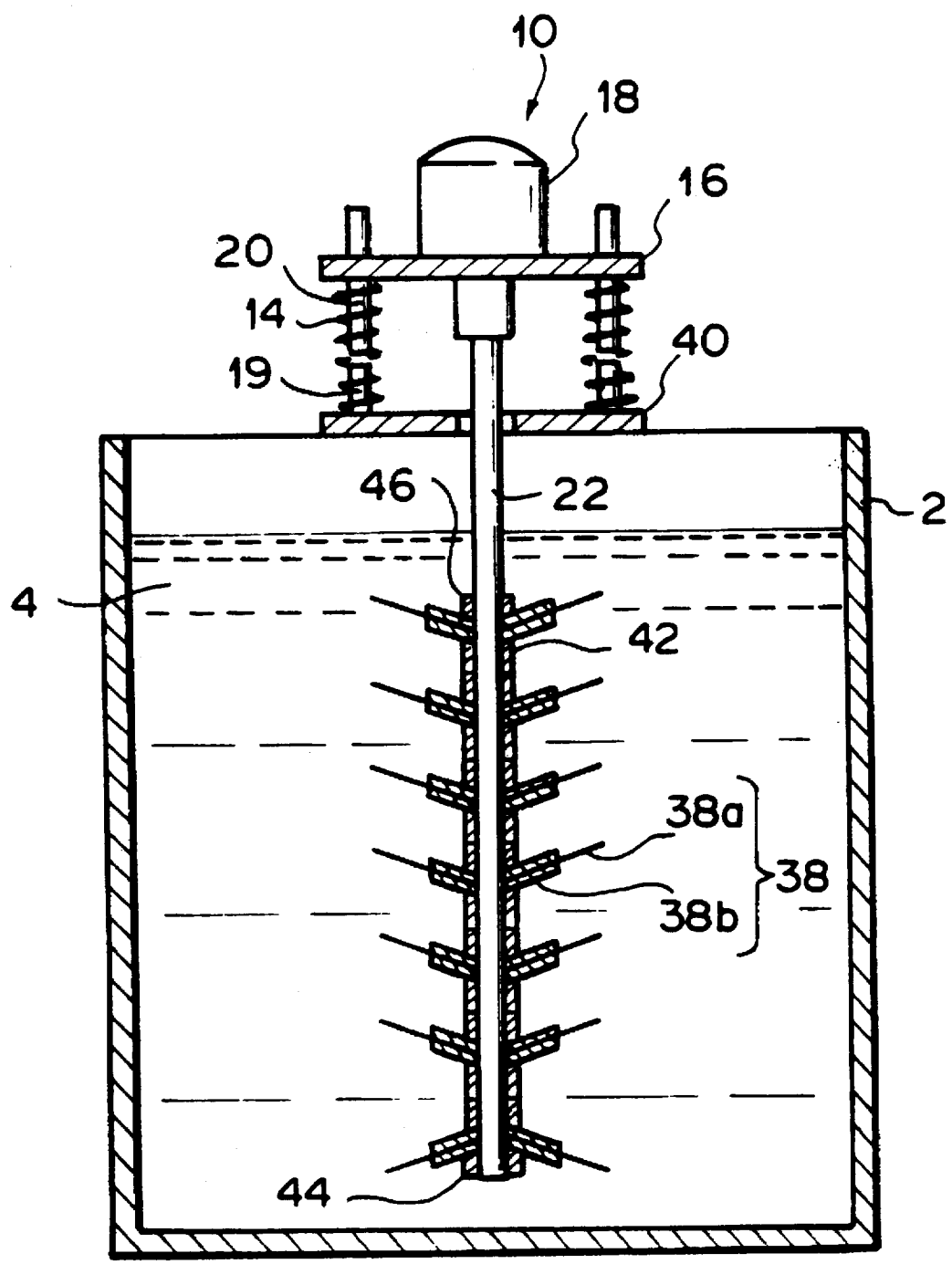
Figure 15:
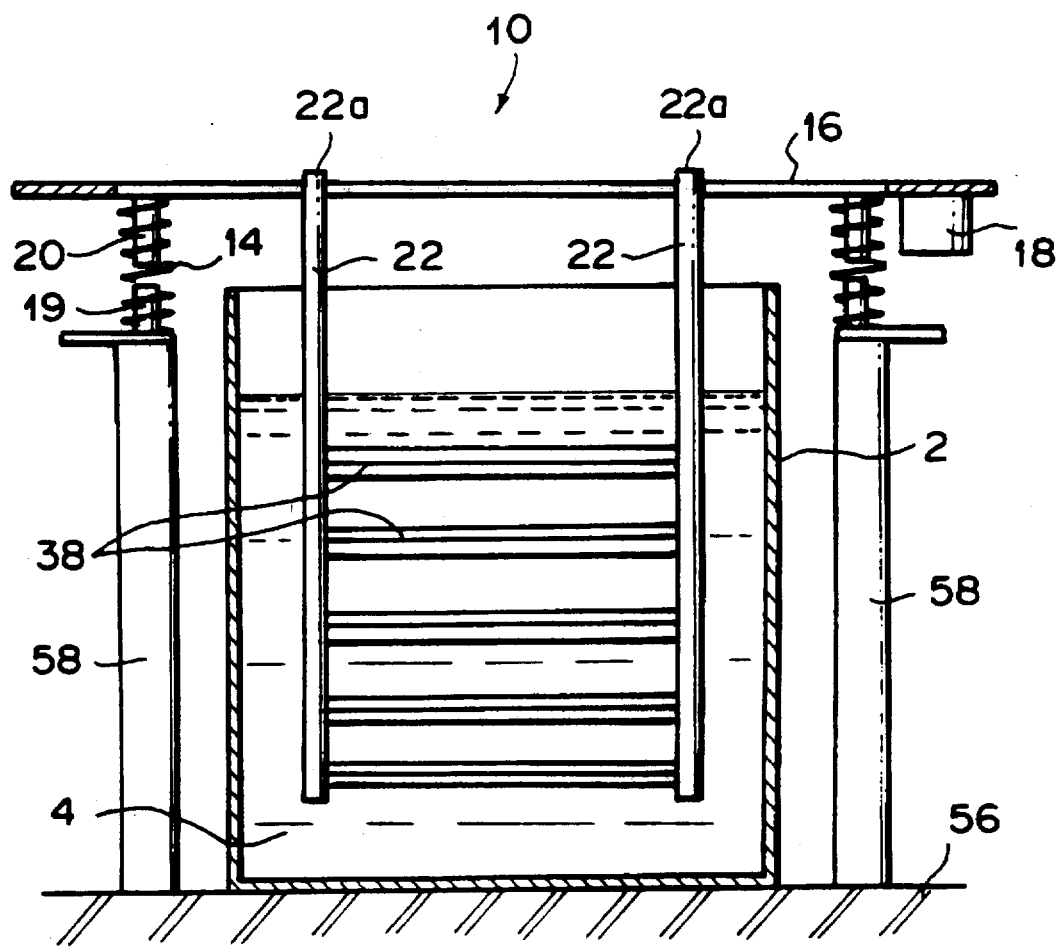

FIGS. 13, 14 and 15 are each a schematic cross-sectional view showing an embodiment of a waste liquid treating apparatus according to the present invention, especially showing the oscillating stirrer 10 and the neighborhood thereof.

In the embodiment of FIG. 13, a stand 40 is mounted through an elastic member 50 on an electrolytic oxidation tank 2, an intermediate oscillation member B2 is provided on the stand 40 in the same manner as the embodiment of FIG. 3 via a coiled spring 14, a lower supporting member 19 and an upper supporting member 20. On the intermediate oscillation member 52, a basic oscillation member 16 is mounted via supporting rods 54. The oscillating motor 18 is secured on the lower surface of the basic oscillating member 16. An oscillating rod 22 is attached to the intermediate oscillation member 52 in analogous manner to the embodiment of FIG. 3. In this embodiment, the oscillating vanes 38 are attached to one oscillation rod 22.

In the embodiment of FIG. 14, among a plurality of oscillating vanes 38 attached to an oscillation rod 22, the lowermost one is inclined and/or bent downwardly while the others are inclined and/or bent upwardly. The bottom portion of the system is well stirred because the lowermost vane is downwardly inclined, so that it can be prevented to cause the stagnation in the bottom portion.

In the embodiment of FIG. 15, a stand 58 is mounted on the floor 56. A basic oscillating member 16 is provided on the stand 58 in the same manner as the embodiment of FIG. 3 via a coiled spring 14, a lower supporting member 19 and an upper supporting member 20. The basic oscillation member 16 is positioned all around the tank 2 to form an annular frame. The oscillating motor 18 is secured on the lower surface of the basic oscillating member 16. The oscillating rod 22 has an attaching portion 22a extending horizontally outwardly of the tank 2 and the attaching portion 22a is secured to the basic oscillating member 16. This embodiment is effective when the thickness of the tank 2 is thin, e.g. below 5 mm for the stainless steel tank.

When the thickness of the tank is below 5 mm, a reinforcing member may be provided around the side wall of the tank as if a belt is fastened around the side wall, and the oscillation generator is disposed thereon.

Figure 16:
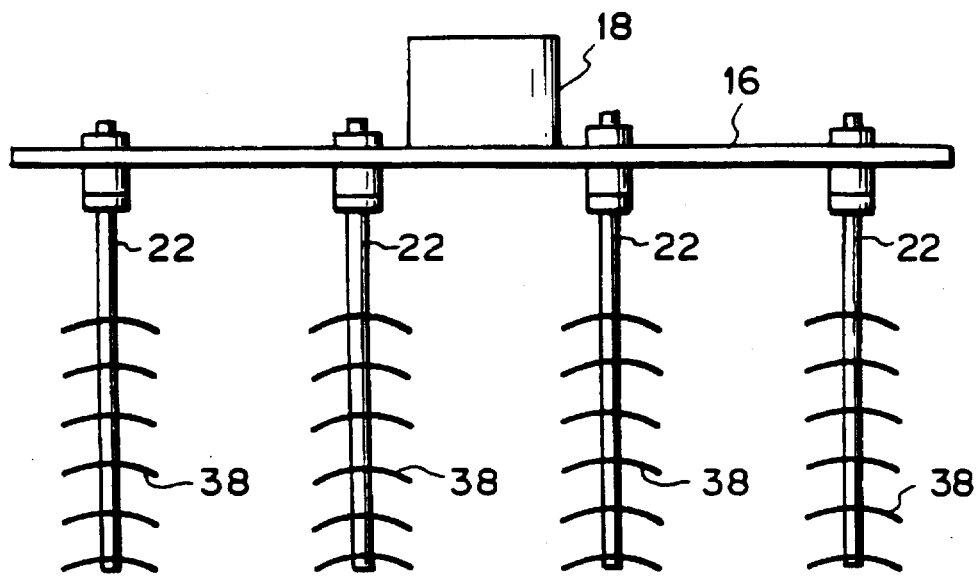
FIGS. 16 and 17 are each a schematic cross-sectional view showing an embodiment of an oscillating stirrer of a waste liquid treating apparatus according to the present invention.
Figure 17:
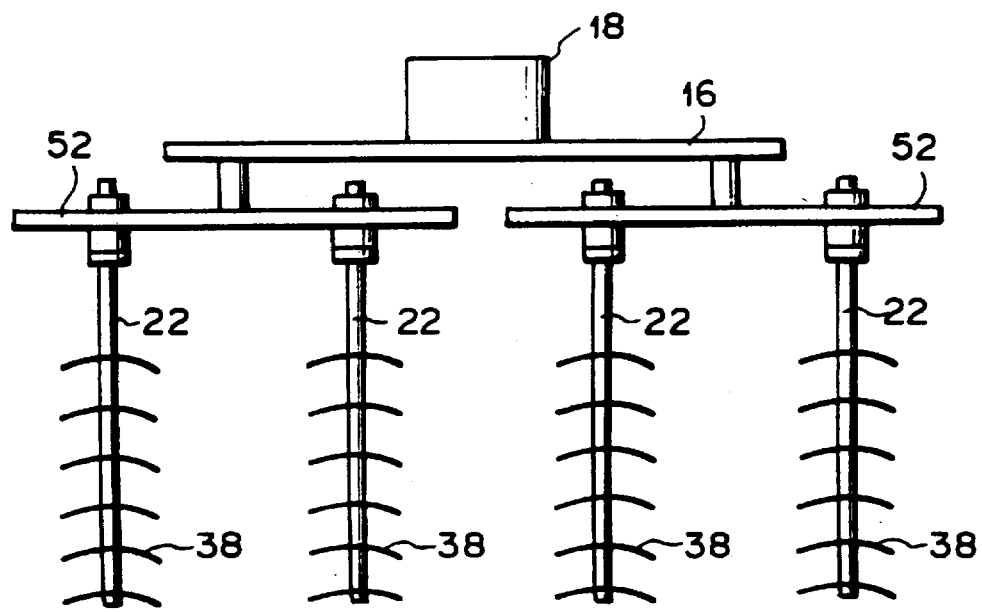

FIGS. 16 and 17 are each a schematic cross-sectional view showing an embodiment of an oscillating stirrer of a waste liquid treating apparatus according to the present invention. In the embodiment of FIG. 16, four oscillation rods 22 are attached to a basic oscillation member 16. In the embodiment of FIG. 17, two intermediate oscillation members 52 are attached to a basic oscillation member 16, and two oscillation rods 22 are attached to each of the intermediate oscillation members In this invention, aeration may be also used in addition to the above-mentioned oscillational stirring by means of the oscillating stirrer, if necessary. The aeration is effected by means of an air diffusing pipe disposed at the bottom of the tank 2. In this case, it is preferably considered not to form an explosive atmosphere because the system produces hydrogen in the electrolysis. Accordingly, the motor is preferably designed in an explosionproof type. Furthermore, a gas discharge hood is preferably provided at the upper portion of the tank 2 to effectively discharge chlorine gas, etc. released in the air.

According to the above-mentioned electrolytic oxidation process associated with vibrational stirring by means of the characteristic vibrational stirrer, the waste liquid can be rapidly treated with superior efficiency. After the process is conducted during a certain period of time, the waste liquid containing a phosphorus component is discharged from the tank 2 via a valve 60 and an outlet 62, as shown in FIG. 1. The waste liquid recovered can be utilized as the fertilizer solution as such or after being neutralized. Nickel is deposited on the cathode 8 to be recovered.

Figure 18:
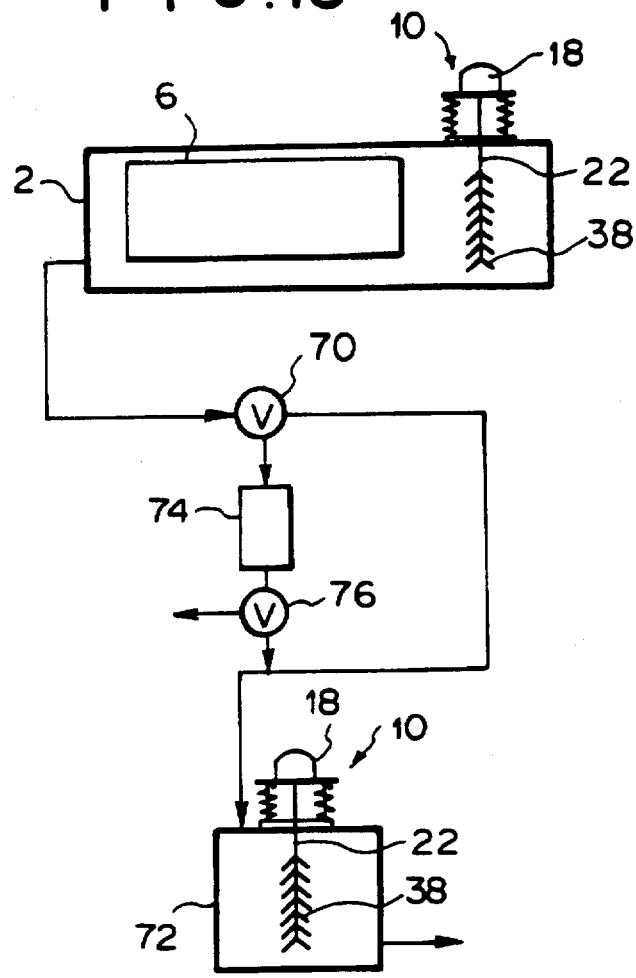
FIGS. 18 and 19 are each a schematic diagram showing an embodiment of a waste liquid treating apparatus according to the present invention.

FIG. 18 shows an embodiment of the waste liquid treating apparatus of the present invention. In FIG. 18, there are arranged the electrolytic oxidation tank 2 provided with the anode 6 and the cathode 8, and the oscillating stirrer 10, which are the same as the above embodiments. The outlet of the tank 2 is communicated with a neutralizing tank 72 via a change-over valve 70. On the neutralizing tank 72, the above-mentioned oscillating stirrer 10 may be provided. A column 74 filled with an adsorbent is positioned in a bypass route which is branched at the valve 70. An outlet of the column 74 is communicated with a main route via a change-over valve 76.

In the neutralizing tank 72, a neutralizer is added to the waste liquid to conduct a neutralizing process. If KOH, $NH_4OH$ or $NH_3$ is used as the neutralizer, K or N works as an effective component of fertilizer to make the resulting fertilizer solution more effective. If the treated waste liquid is not utilized as the fertilizer solution, NaOH may be used as the neutralizer.

As the adsorbent, chelate forming resin, ion exchanging and chelate forming resin (for example, "Metallite" [trade name] produced by Japan Techno Corp.), lignite, charcoal, activated charcoal or the like can be used. When the waste liquid is passed through the column, nickel ions can be removed almost perfectly to make the treated liquid more harmless.

If the valves 70 and 76 are operated with certain relationship, one of the following processes is performed:
(1) the electrolytic oxidation with vibrational stirring → neutralization, (2) the electrolytic oxidation with vibrational stirring → metal ion adsorbtion, and (3) the electrolytic oxidation with vibrational stirring → metal ion adsorbtion → neutralization.

Incidentally, the waste liquid may be treated by circulating between the electrolytic oxidation tank 2 and the column 74 via a route not shown to conduct the electrolytic oxidation and the metal ion adsorbtion and then supplying the liquid to the neutralizing tank 72 to conduct the neutralization.

Figure 19:
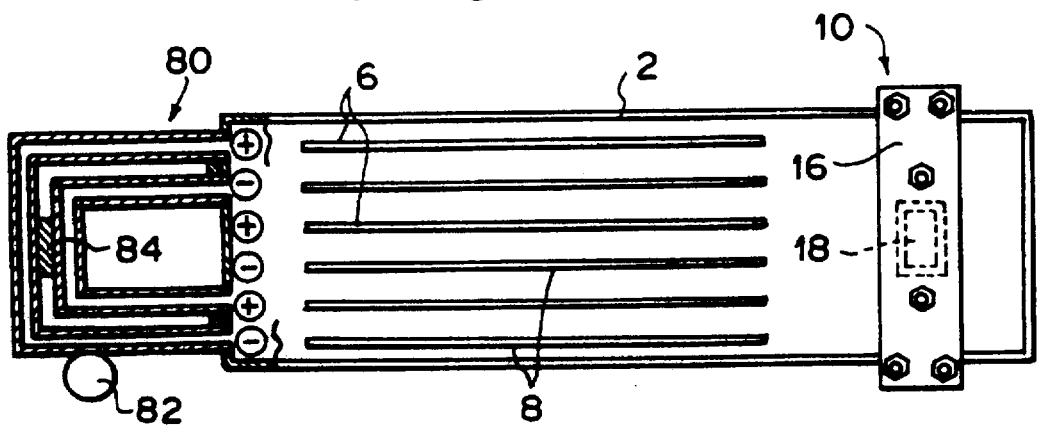

FIG. 19 shows another embodiment of the waste liquid treating apparatus of the present invention. In FIG. 19, there are arranged the electrolytic oxidation tank 2 provided with the anode 6 and the cathode 8, and the oscillating stirrer 10, which are the same as the above embodiments. On the tank 2, there is provided a waste liquid circulating route 80 which comprises a coaxially disposed inner and outer pipes. The waste liquid is passed through between the inner and outer popes. Reference numeral 82 denotes a pump for circulating the liquid. At least a part of the inner pipe is made of quartz glass and, in the inside of this part, there is positioned a wide range ultlaviolet lamp 84. When turning on the lamp 84, the waste liquid is treated by ultraviolet-light irradiation to expedite lowering of COD or BOD.

The present invention will be described in more detail with the following examples, however, the present invention is not limited to the following examples.

EXAMPLE 1

An electroless Ni plating waste liquid is treated by means of the apparatus of FIG. 18.

(1) Waste liquid used

Nickel sulfate of 30 g/liter (corresponding to 5200 ppm nickel and COD 15000 ppm), sodium hypophosphite of 30 g/liter and glycine of 20 g/liter were used as main components.

(2) Electrolytic oxidation tank 2, anode 6 and cathode 8

An electrolytic oxidation tank 2 of FRP was designed in a dimension of W500[mm]×L1100[mm]×H700[mm] and a volume of 300 liters. As the anode 6 were used nine plates (W180[mm]×H900[mm]×[mm]) each having a hole, each of which was obtained by coating the surface of a titanium plate with α type lead peroxide layer and then β type lead dioxide layer to form the entire lead oxide layer at a thickness of 0.5 to 1 mm. As the cathode 8 were used twelve punched plates (W180[mm]×H800[mm]×3[mm]) of stainless steel (SUS-304).

(3) Oscillating stirrer 10

Six oscillation vanes 38 which were made of stainless steel (SUS-304) and formed at a thickness of 0.5 mm were secured to two oscillating rods 22 while downwardly inclined at 15 degrees were used. The oscillating rods 22 was driven by an inverter type oscillating motor (150 W×200 V, 3 phase) 18 to cause the vertical oscillation.

(4) Operation

The above waste liquid of 300 liters were poured into the electrolytic oxidation tank 2 while keeping the distance between the anode 6 and the cathode 8 at 50 mm, and electrolysis accelerator (KCl: alternatively NaCl may be used) of 15 liters were added to the waste liquid. Current of 3 to 5 A/liter with voltage of 12 V was supplied to the electrodes through a 1000 A rectifier to perform the electrolytic oxidation of the waste liquid.

Furthermore, oscillation of 40 Hz was produced in the oscillating stirrer 10 by means of an inverter to vibrationally stir the waste liquid 4 in the tank 2.

At an initial stage of the process, a bath temperature was kept at 40° to 50° C. by means of a heater. As the electrolytic oxidation progressed, the temperature increased to 70° to 80° after four hours and at this time the content of nickel in the liquid 4 was sufficiently lowered to 2 ppm and pH was equal to 4.5.

Incidentally, when the oscillating stirrer 10 was used with oscillation vanes 38 attached to the rods 22 while upwardly inclined at 15 degrees, substantially the same result was obtained in about twice period of process time.

Thus, the treated waste liquid having a lower nickel content and a higher phosphorus content of 10% or more was obtained. The liquid was effective for utilizing as a fertilizer solution.

EXAMPLE 2

The treated waste liquid obtained in Example 1 was passed through a column 74 filled with lignite (black granule, apparent specific gravity of 0.7 kg/liter, water content of about 30%, grain size of 1 to 3 mm) by adjusting the valves 70 and 76. The nickel content of the resulting liquid was 0 ppm. The liquid was effective for utilizing as a fertilizer solution.

EXAMPLE 3

The treated waste liquid obtained in Example 1 was passed through a column 74 filled with the lignite and introduced into the neutralizing tank 72 by adjusting the valves 70 and 76. In the neutralizing tank 72, potassium hydroxide solution used as the neutralizer was added to the waste liquid while conducting the oscillational stirring to set the pH value to 6.5 to 7.0. In this neutralizing process, the oscillational stirring is not indispensable, however, it improves the efficiency of the neutralization.

Thus, 300 liters of the treated waste liquid containing a potassium and having a phosphorus content of about 10% was obtained, which was effective for utilizing as a fertilizer solution.

EXAMPLE 4

After the process of Example 1 was repeated, in this Example, the electrolytic oxidation was further conducted for four hours while keeping the system at a temperature of 70° to 80° C.

Thus, the treated waste liquid having a nickel content of 0 ppm and a phosphorus content of 5% or more was obtained. The liquid was effective for utilizing as a fertilizer solution.

EXAMPLE 5

The treated waste liquid obtained in Example 4 was introduced into the neutralizing tank 72 by adjusting the valve 70. In the neutralizing tank 72, potassium hydroxide solution used as the neutralizer was added to the waste liquid while conducting the oscillational stirring to set the pH value to 6.5 to 7.0.

Thus, the treated waste liquid containing a potassium and having a phosphorus content of about 5% was obtained, which was effective for utilizing as a fertilizer solution.

EXAMPLE 6

The process of Example 3 was repeated except that NaOH solution was used as the neutralizer. The analogous result was obtained.

EXAMPLE 7

The process of Example 5 was repeated except that NaOH solution was used as the neutralizer. The analogous result was obtained.

EXAMPLE 8

A waste liquid having the following composition was used:

| | |
|---|---|
| Nickel sulfate | 20 g/liter |
| Sodium citrate | 30 g/liter |
| Sodium hypophosphite | 15 g/liter |
| NaOH | 5 g/liter |

The same apparatus as Example 1 was used under the same condition. However, prior to the electrolytic oxidation, the pH value was adjusted to 4 to 5 with sulfuric acid, and the electrolytic oxidation was started at an initial temperature of 40° to 50° C. After six hours, the temperature was increased to 70° to 80° C. The pH value of the treated liquid at this time was equal to 7, and the nickel content was sufficiently lowered to 1 ppm.

Thus, the treated waste liquid having a lower nickel content and a higher phosphorus content was obtained. The liquid was effective for utilizing as a fertilizer solution.

EXAMPLE 9

The treated waste liquid obtained in Example 8 was passed through a column 74 filled with the lignite by adjusting the valves 70 and 76. The nickel content of the resulting liquid was 0 ppm. The liquid was effective for utilizing as a fertilizer solution.

EXAMPLE 10

Radishes were raised with the fertilizer solutions obtained in Examples 1 to 9, and they grew more excellent in all points such as germination, growth, etc. as compared with radishes which were raised with only water. These radishes were picked up and it was analyzed whether some metals were contained. As a result of the analysis, it was proved that no metal of harmful level was contained.

EXAMPLE 11

An electroless Ni plating waste liquid is treated by means of the apparatus of FIG. 19 in which the electrolytic oxidation was conducted with oscillational stirring.

Into the electrolytic oxidation tank 2 made of thermostable vinyl chloride resin having the volume of 200 liters is poured a 180 liters of electroless Ni plating waste liquid having nickel sulfate of 30 g/liter (corresponding to 5200 ppm nickel), sodium hypophosphite of 30 g/liter and glycine of 20 g/liter and the pH value of 4.2. Three pairs of anode 6 and cathode 8 of the same materials as the above Examples were used.

In the oscillating stirrer 10, seven oscillation vanes 38 which were made of stainless steel (SUS-304) and formed at a thickness of 0.5 mm were secured to two oscillating rods 22 while downwardly inclined at 15 degrees. The oscillating rods 22 were driven by an inverter type oscillating motor (75 W×200 V, 3 phase) 18 at 42 Hz to cause the vertical oscillation.

The nickel content, COD and pH of the liquid were varied as the progress of the treatment, as in the following Table 3:

TABLE 3

| Time of Treatment (hr) | Ni content (ppm) | COD (ppm) | pH | Temperature (°C.) |
|---|---|---|---|---|
| 0 | 5200 | 11500 | 4.7 | 25 |
| 4 | 2 | 2000 | 3.7 | 60 |
| 8 | 0 | 450 | 3.7 | 60 |
| 10 | 0 | 105 | 3.7 | 60 |
| 12 | 0 | 45 | 3.7 | 60 |

Thus, the treated waste liquid having a lower nickel content and a higher phosphorus content was obtained in the treatment of about four hours. The liquid was effective for utilizing as a fertilizer solution. With the treatment of about 10 hours, COD were lowered sufficiently.

COMPARATIVE EXAMPLE 1

The process of Example 11 was repeated except that no oscillational stirring was conducted. This corresponds to the conventional electrolytic oxdation process.

After four hours from the start of treatment, the nickel content of the waste liquid was so high as could not be exactly determined by a nickel pack test, i.e. at least 100 ppm, and COD of the liquid was 7000 to 8000 ppm.

EXAMPLE 12

The process of Example 11 was repeated except that the liquid was passed partially through the circulating route 80 at a flow rate of 1.5 liter/min with irradiating the ultraviolet-light.

The treated waste liquid having a nickel content of 1 ppm and a COD of 20 ppm was obtained in the treatment of four hours. The liquid was effective for utilizing as a fertilizer solution.

Thus, it was proved that the combination of the electrolytic oxidation with the oscillational stirring and the ultraviolet-light irradiation was significantly effective.

EXAMPLE 13

The process of Examples 11 and 12 were each repeated except that the anode 6 of stainless steel plate and the cathode of copper plate plated with nickel were used, and a waste liquid having the following composition was used:

| | |
|---|---|
| Nickel sulfate | 5 g/liter |
| Sodium hypophosphite | 25 g/liter |
| Sodium sulfite | 25 g/liter |
| Succinic acid | 25 g/liter |

As a result, the treated waste liquids having a lower nickel content and a lower COD was obtained as in Examples 11 and 12. The liquid was effective for utilizing as a fertilizer solution.

EXAMPLE 14

The process of Example 1 was repeated except that a waste liquid having the composition as shown in the following Tables 4 and 5, the first row corresponding to the time of treatment of 0 was used, 30 liters of NaCl was added as the electrolysis accelerator, current of 900 A (3 A/liter) and the voltage of 5 to 5.5 V was used in the electrolysis, the area of the anode was 216 $dm^2$, ratio of areas of the anode and cathode was 1:1, and seven oscillation vanes made of thermostable vinyl chloride resin were used in the oscillating stirrer.

Two different ways of configuration of the vanes were employed in the treatment, namely, the vanes secured to the oscillating rods downwardly inclined at 15 degrees in one case (Case A) and upwardly inclined at 15 degrees in the other case (Case B).

The nickel content and COD of the liquid were varied as the progress of the treatment, as in the following Table 4 for the case A and in the following Table 5 for the case B:

TABLE 4

| Time of Treatment (hr) | Ni content (ppm) | COD (ppm) | Temperature (°C.) |
| --- | --- | --- | --- |
| 0 | 4500 | 35000 | 23 |
| 2 | 3000 | 18000 | 59 |
| 4 | 1500 | 13000 | 73 |
| 6 | 800 | 8000 | 73 |
| 8 | 100 | 2000 | 73 |
| 10 | 2 | 300 | |

TABLE 5

| Time of Treatment (hr) | Ni content (ppm) | COD (ppm) | Temperature (°C.) |
| --- | --- | --- | --- |
| 0 | 4500 | 35000 | 23 |
| 2 | 3000 | 18000 | 59 |
| 4 | 2000 | 16000 | 70 |
| 6 | 1500 | 13000 | 73 |
| 8 | 800 | 8000 | 73 |
| 10 | 300 | 4000 | 73 |
| 12 | 100 | 2000 | 73 |
| 14 | 10 | 500 | |
| 15 | 2 | 300 | |

Thus, it was proved that the case A where the oscillating rods were downwardly inclined is superior on the point of the efficiency of the treatment to the case B where the oscillating rods were upwardly inclined.

It should be noted that this invention is not restricted to the above examples which relate to the treatment of the electroless nickel plating waste liquid, but also applicable to the treatment of the waste liquid of electroless plating of copper, cobalt, tin, silver, gold or alloys thereof to rapidly recover such metals and lower COD and BOD. Furthermore, this invention is applicable to the treatment of the degreaser waste liquid to lower COD and BOD. For example, when treating the electroless copper plating waste liquid or the degreaser waste liquid, COD can be lowered to about 200 ppm by about 8 hours electrolytic oxidation with oscillational stirring.

What is claimed is:

1. A method for treating a waste liquid containing metal ions, said waste liquid being accommodated in an electrolytic oxidation tank, wherein
    said waste liquid is treated by electrolytic oxidation by vibrating and fluidizing the waste liquid by means of an oscillating stirrer to recover said metal ions on a cathode as metal and to lower the COD of said waste liquid,
    said oscillating stirrer comprising a low frequency oscillation generator, an oscillation transmitter connected to said low frequency oscillation generator, and at least one oscillating vane attached to said oscillation transmitter, said oscillating vane being such that a tip end portion thereof is fluttered when a low frequency oscillation is transmitted from said oscillation transmitter to said oscillating vane.

2. The method as claimed in claim 1, wherein a frequency of said low frequency oscillation generator is within a range of 25 to 500 Hz.

3. The method as claimed in claim 1, wherein said waste liquid is an electroless nickel plating waste liquid.

4. The method as claimed in claim 1, wherein said metal ions are recovered on the cathode as the metal as well as the waste liquid in which an active component for fertilizer remains is recovered as a fertilizer solution of lowered COD.

5. The method as claimed in claim 4, wherein a first step is conducted to recover the metal ions in which first step the waste liquid is treated by the electrolytic oxidation with vibrating and fluidizing the waste liquid by means of the oscillating stirrer, and then a second step is conducted to recover as the fertilizer solution the waste liquid in which the active component for fertilizer remains in which second step a neutralizer is added to neutralize the waste liquid.

6. The method as claimed in claim 5, wherein said neutralizer comprises at least one of KOH, $NH_3$ and $NH_4OH$.

7. The method as claimed in claim 1, wherein said oscillating vane is attached to a vane attaching portion of said oscillation transmitter, said vane attaching portion extends and oscillates in a vertical direction, and said oscillating vane is inclined relative to a horizontal plane.

8. The method as claimed in claim 7, wherein said oscillation vane is inclined so as to gradually lower as advancing from a portion attached to said vane attaching portion to a tip end portion.

9. The method as claimed in claim 8, wherein said oscillation vane is inclined at 5 to 30 degrees relative to the horizontal plane.

10. An apparatus for treating a waste liquid containing metal ions to recover said metal ions as metal and to lower COD of said waste liquid, comprising:
    an electrolytic oxidation tank provided with at least a pair of electrodes, on one of which electrodes the metal is recovered; and
    an oscillating stirrer for vibrating and fluidizing said waste liquid accommodated in said electrolytic oxidation tank,
    wherein said oscillating stirrer comprises a low frequency oscillation generator, an oscillation transmitter connected to said low frequency oscillation generator, and at least one oscillating vane attached to said oscillation transmitter, said oscillating vane being such that a tip end portion thereof is fluttered when a low frequency oscillation is transmitted from said oscillation transmitter to said oscillating vane.

11. The apparatus as claimed in claim 10, wherein said low frequency oscillation generator has a means for varying a frequency of the oscillation.

12. The apparatus as claimed in claim 10, wherein a first vibrational stress dispersing means is interposed between said low frequency oscillation generator and said oscillation transmitter.

13. The apparatus as claimed in claim 10, wherein said oscillating vane comprises a vane plate, a fixing member for the vane plate and a second vibrational stress dispersing means interposed between said vane plate and said fixing member.

14. The apparatus as claimed in claim 10, wherein said oscillating vane is attached to a vane attaching portion of said oscillation transmitter, said vane attaching portion extends and oscillates in a vertical direction, and said oscillating vane is inclined relative to a horizontal plane.

15. The apparatus as claimed in claim 14, wherein said oscillation vane is inclined so as to gradually lower as advancing from a portion attached to said vane attaching portion to a tip end portion.

16. The apparatus as claimed in claim 15, wherein said oscillation vane is inclined at 5 to 30 degrees relative to the horizontal plane.

17. The apparatus as claimed in claim 10, further comprising a neutralizing tank in which said waste liquid discharged from said electrolytic oxidation tank is neutralized.

18. The apparatus as claimed in claim 10, wherein said low frequency oscillation generator has an oscillation motor for generating the low frequency oscillation.

* * * * *